United States Patent [19]

Tingle

[11] Patent Number: 4,798,372
[45] Date of Patent: Jan. 17, 1989

[54] CUTTING TRAY

[76] Inventor: Joseph R. Tingle, 328 S.E. 17th Pl., Cape Coral, Fla. 33990

[21] Appl. No.: 93,729

[22] Filed: Sep. 8, 1987

[51] Int. Cl.$^4$ ............................................. B23Q 1/00
[52] U.S. Cl. .................................... 269/59.5; 269/88; 269/284 R; 269/302.1
[58] Field of Search ................. 269/302.1, 289 R, 88, 269/15, 54.5; 108/93, 28; 248/DIG. 12

[56] References Cited

U.S. PATENT DOCUMENTS

| | | | |
|---|---|---|---|
| 571,349 | 11/1896 | Farquhar | 269/302.1 |
| 1,099,996 | 6/1914 | Parsons | 269/289 |
| 1,702,144 | 2/1929 | Weston | 269/289 |
| 2,599,681 | 6/1952 | Wells | 269/54.5 |
| 2,609,024 | 9/1952 | Russ | 269/289 R |
| 3,654,979 | 4/1972 | Montgomery | 269/289 |
| 4,436,356 | 3/1984 | Stelling | 269/289 R |

Primary Examiner—Robert C. Watson
Attorney, Agent, or Firm—Charles J. Prescott

[57] ABSTRACT

A cutting tray is formed in two parts: a bottom portion or pan, and a removeable cutting platform. The pan is molded to include a central raised platform support having a recessed bottom and an upright rim. The recessed bottom may include reinforcing ribs. The cutting platform is provided in a plurality of forms including different cutting surface areas and cutting surface textures. The cutting platform is removeably secured to the raised platform support by protuberances on the cutting platform fitting into receptacles on the platform support, or by having a recessed bottom on the cutting platform which mates with the platform support.

12 Claims, 1 Drawing Sheet

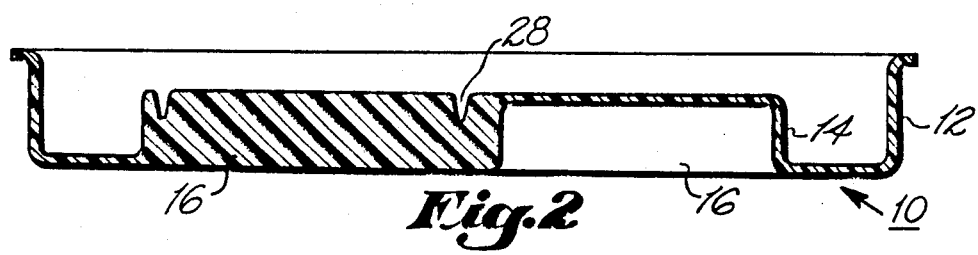
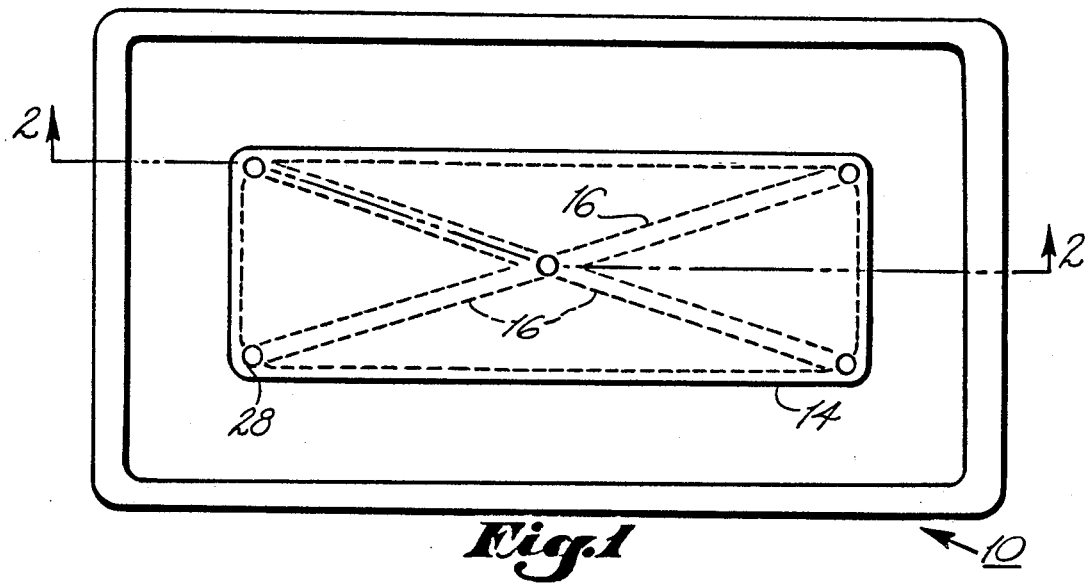
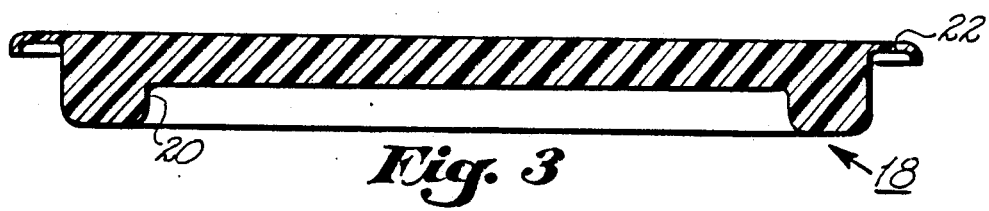
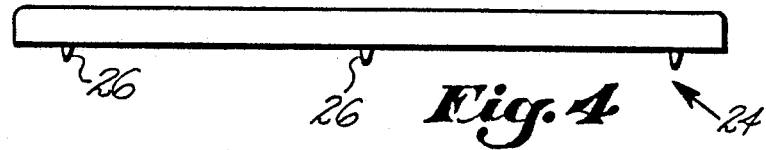
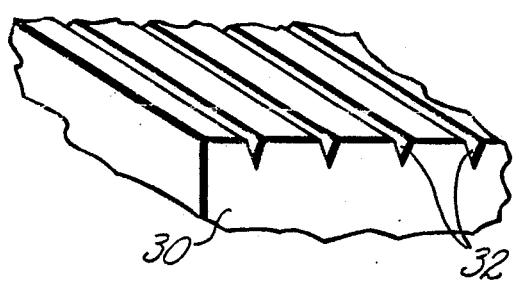
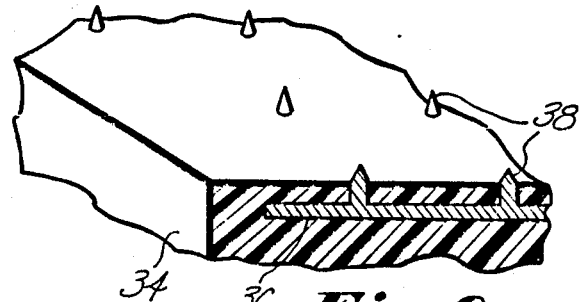

CUTTING TRAY

BACKGROUND OF THE INVENTION

1. Field of the Invention

This invention relates generally to a cutting tray, and more particularly to a cutting tray having alternate cutting surfaces.

2. Description of Related Art

The problems associated with cutting various types of materials have led to the development of a number of different devices of various degrees of specialization. Thus for cutting flesh, carving trays having channels to convey juices to one location have been devised. In addition, cutting surfaces having different sized and shaped areas and having different surface textures to aid in retaining in position the material being cut have been produced.

It is therefore an object of this invention to provide a cutting tray having a plurality of alternative cutting surfaces of various areas and surface types.

It is also an object of this invention to provide a cutting surface on a platform detachable from a platform support in the center of the cutting tray.

SUMMARY OF THE INVENTION

The invention is a cutting tray having a bottom portion with an upright peripheral rim and a central, elevated platform support. The platform support will hold any one of a plurality of cutting platforms in a secure yet detachable manner. The cutting platforms provide surface areas of different sizes and having different surface configurations which enhance usefulness of the cutting tray. The cutting tray is formed of moldable material and the platform support has a recess on the bottom side which is reinforced with ribs.

In accordance with these and other objects, which will become apparent hereinafter, the instant invention will now be described with reference to the accompanying drawings.

BRIEF DESCRIPTION OF THE DRAWINGS

FIG. 1 is a plan view of the bottom portion of a cutting tray in accordance with the invention;

FIG. 2 is a cross-section of FIG. 1 taken on the line 2—2 of FIG. 1;

FIG. 3 is a cross-section of an embodiment of a cutting platform to be mounted on the cutting tray of FIG. 1;

FIG. 4 is a side elevation of an alternate embodiment of a cutting platform to be mounted on the cutting tray of FIG. 1;

FIG. 5 is a detail of a cutting platform having a grooved cutting surface; and

FIG. 6 is a detail of a cutting platform, partially in cross-section, having spikes protruding from the cutting surface.

DESCRIPTION OF THE PREFERRED EMBODIMENT

Referring to FIGS. 1 and 2, a bottom portion 10 of a cutting tray having an upright peripheral rim 12 forming four sides is shown. Elevated platform support 14 is positioned within bottom portion 10 and is displaced from all four sides. As is most clearly shown in FIG. 2, the under side of bottom portion 10 is recessed to provide the elevation to the platform support 14. This recessed portion has ribs 16 extending across it so that the upper side of platform support 14 will be substantially rigid to resist the stresses imposed by cutting.

It should be recognized that wooden cutting boards are substantially expensive. The present invention is intended to be a lower cost item while still providing the necessary utility. Thus a molded structure is utilized. Although a variety of materials may be found to be useful for this purpose, a platform support molded of polyethylene and a cutting platform molded of dense structural foam have the required characteristics. It will be evident that other moldable engineering plastics can be substituted.

In accordance with the invention, cutting platform 18, shown in FIG. 3, is provided with a recessed bottom 20 which is sized to fit snuggly over platform support 14 of FIGS. 1 and 2. Cutting platform 18 is sized so that lip 22 will extend over rim 12 of bottom portion of pan 10. This structure provides a large cutting area and also provides additional support for the cutting platform beyond that provided by the raised platform support 14.

In FIG. 4, cutting platform 24 is removeably secured to platform support 14 by a plurality of spaced protuberances 26 which are positioned to mate with a similar plurality of spaced receptacles 28 on platform support 14. Cutting platform 24 is also sized to extend only a short distance beyond platform support 14 thereby providing a gutter around cutting platform 24 in which juices and scraps will be retained. This arrangement is useful where the juices are to be used for gravy or the like. It will be evident that other variations may be made, for example, a cutting platform may extend over the rim on three sides to leave one side with an adjacent gutter.

Although the cutting platform may have a cutting surface which is smooth, for some purposes a surface which will prevent or retard movement of the material being cut may be preferred. Referring to FIG. 5, a detail of a corner of a cutting platform 30 is depicted, having a plurality of parallel grooves 32 in the cutting surface. In this representation the grooves are parallel to one side of the cutting platform; however, grooves which are arranged in diagonal patterns, cross-hatched groove, etc. may also be employed. A most important characteristic of the cutting surface is that it be relatively impervious to knife cuts.

FIG. 6 shows cutting platform 34 having embedded therein plate 36. Plate 36 has a plurality of spaced spikes 38 protruding therefrom and extending through the cutting surface.

The removable nature of the cutting platform from the bottom portion of the cutting tray permits the same bottom portion to be used with different cutting platforms, so that a consumer may buy a single cutting platform to suit his needs, or buy more than one platform, while purchasing a single bottom portion.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A cutting tray comprising:
   a molded, rectangular pan having a peripheral upright rim forming four sides;

a raised rectangular platform support integrally formed with said pan positioned within and displaced from said four sides;

said platform support having an upper surface having a plurality of spaced receptacles therein;

a dense molded rectangular cutting platform having a cutting surface area and said platform removeably secured to said platform support; and said cutting platform having an under surface having a plurality of spaced protuberances positioned to mate with said spaced receptacles.

2. A cutting tray in accordance with claim 1 wherein: said cutting platform has a recessed bottom sized to fit snuggly over said platform support.

3. A cutting tray in accordance with claim 1 wherein: said cutting platform has a textured surface on at least a portion of said cutting surface area.

4. A cutting tray in accordance with claim 1 wherein: said cutting surface area is sized to extend beyond said upper surface of said platform support.

5. A cutting tray in accordance with claim 1 wherein: said cutting surface area is sized to extend beyond said upright rim.

6. A cutting tray in accordance with claim 1 wherein: said cutting surface area is relatively impervious to knife cuts.

7. A cutting tray in accordance with claim 1 wherein: said platform support has a recessed bottom.

8. A cutting tray in accordance with claim 7 wherein: said recessed bottom has reinforcing ribs.

9. A cutting tray in accordance with claim 1 wherein: said cutting surface area has a plurality of spaced spikes protruding therefrom.

10. A cutting tray in accordance with claim 3 wherein: said textured surface has parallel grooves.

11. A cutting tray assembly adapted for providing different cutting surfaces comprising:

a molded pan having a rectangular peripheral upright rim;

a raised rectangular platform support integrally formed with said pan positioned within and displaced from said rim;

said platform support having a recessed bottom having reinforcing ribs;

a dense molded rectangular cutting platform having a cutting surface area; and said platform removeably secured to said platform support.

12. A cutting tray in accordance with claim 11 wherein: said cutting surface area is sized to extend beyond said platform support.

* * * * *